(12) United States Patent
Dicke et al.

(10) Patent No.: US 8,380,633 B2
(45) Date of Patent: Feb. 19, 2013

(54) TIME-SLICING METHOD AND SYSTEM FOR DIGITAL BOOKS

(76) Inventors: Ronald Dicke, Ottawa (CA); Gordon Freedman, Ottawa (CA)

( * ) Notice: Subject to any disclaimer, the term of this patent is extended or adjusted under 35 U.S.C. 154(b) by 0 days.

(21) Appl. No.: 13/160,948

(22) Filed: Jun. 15, 2011

(65) Prior Publication Data

US 2011/0314556 A1 Dec. 22, 2011

Related U.S. Application Data (60) Provisional application No. 61/355,286, filed on Jun. 16, 2010.

(51) Int. Cl.
*G06Q 99/00* (2006.01)
(52) U.S. Cl. ............... 705/59; 705/1.1; 705/51; 726/27
(58) Field of Classification Search .................. 705/1.1, 705/51, 59; 726/27
See application file for complete search history.

(56) References Cited

U.S. PATENT DOCUMENTS

2007/0255580 A1* 11/2007 Cole et al. .................... 705/1

FOREIGN PATENT DOCUMENTS

| WO | WO02/39206 A2 | * | 5/2002 |
| WO | WO2011/049999 | * | 4/2011 |

OTHER PUBLICATIONS

Chadwell, "What's Next for Collection Management and Managers? User-Centered Collection Management", The Valley Library, Oregon State University, 2009, 11 pages.*

* cited by examiner

*Primary Examiner* — James D Nigh
(74) *Attorney, Agent, or Firm* — Freedman & Associates (57) ABSTRACT

A method is provided in which time slicing data, including an indication of available time blocks for loaning an e-book from an e-book lending library, are provided to a user in response to the user requesting to borrow an e-book that is not currently available for being loaned. When the user selects an available time block via an electronic device, the e-book lending library provides to an electronic device that is associated with the user, via the communications network, a lending license for the e-book that is valid only during the selected available time block. The e-book lending library enables access to the first e-book via the electronic device, during the selected time block, using the provided lending license.

23 Claims, 10 Drawing Sheets

TIME-SLICING METHOD AND SYSTEM FOR DIGITAL BOOKS

FIELD OF THE INVENTION

The instant invention relates generally to digital books or e-books, and more particularly to a method and system for sharing access, between a plurality of different users, to a borrowed e-book having a single lending license associated therewith.

BACKGROUND OF THE INVENTION

A digital book, which is also known as an electronic book or an e-book, is the digital media equivalent of a conventional printed book. Typically, digital books are structured as virtual frames presented on a display device. During a reading session a user may turn or change from one virtual frame or "page" to another. Advantageously, the "pages" are not fixed permanently, and may be redefined or repaginated based on variances in display conditions, such as screen size, font type or size, margins, line spacing, resolution, etc.

Conveniently, digital books may be read on personal computers, personal digital assistants (PDAs), smart phones, etc., or on dedicated hardware devices known as e-book readers or e-book devices. Another convenience that is associated with digital books is the ability to purchase and download, or download and store, a reading selection directly from a digital library or commercial site. Some e-book readers, such as for instance Amazon's Kindle 2, use a 3G wireless network to allow the user to download digital books directly to the device, even if a Wi-Fi hotspot is not available. Other devices that can be "repurposed" for reading digital books, such as for instance Apple's IPod Touch, achieve similar functionality using a local wireless network connection.

Digital books currently offer several conveniences compared to conventional printed books. For instance: text can be searched automatically and cross-referenced using hyperlinks; font size and font type can be customized; non-permanent highlighting and annotation is supported; animated images or multimedia clips are supported; reading can resume automatically at the last read page, etc. In addition, a single e-book reader containing the text of several digital books is easier to carry around than the same books in printed form. Furthermore, the backlit display of an e-book reader allows reading in low light, or even in total darkness.

Of course, lending libraries of digital books are known. For instance, many public libraries currently allow registered patrons to borrow digital books via a library webpage. In this type of system the patron typically borrows a digital book from the lending library for a predetermined finite period of time, after which time the digital book is returned automatically to the digital book lending library. In practice, the digital book is made available for being viewed by the patron during the predetermined finite period of time, such as for instance using a display portion of an electronic device that is associated with the patron. Once the predetermined finite period of time has elapsed the digital book is no longer accessible using the electronic device, unless of course the patron "renews" the loan. Advantageously, digital libraries offer their patrons the convenience of being able to borrow digital books at any time, usually twenty-four hours a day and seven days a week, without ever having to enter a physical branch of the library. In addition, patrons do not need to be concerned about incurring late return fees, since the digital books are returned automatically at the end of the loan period.

Of course, a digital book lending library also shares some features in common with traditional bricks-and-mortar libraries. For example, when one patron is using a license that is associated with a digital book, then that digital book is not available for being loaned to any other patron until after it has been "returned." Generally, a digital book is loaned to a patron for a predetermined finite period of time—the loan period—such as for instance 14 days or 21 days, although any arbitrary loan period may be defined. Of course, the patron is highly unlikely to access the digital book continuously during the entire loan period. As a result, typically the digital book is not being utilized during substantial blocks of time within any given loan period. For instance, the digital book is not utilized when the patron is sleeping, attending classes, working, etc. Since the patron retains the license during the entire loan period, the result is that the digital book tends to be under utilized even though other patrons may require access to the same digital book.

The above-mentioned problems are most serious when a large number of patrons require simultaneous access to the same digital book. For instance, students that are registered in a particular course need to have access to required reading books at certain specific times during the course. When the number of students exceeds the number of licenses available, then some of the students are unable to borrow the digital book. Additionally, some of the students that are able to borrow the digital book may later be unable to renew the loan because, in the mean time, another patron has placed a hold on the digital book. Thus, borrowing certain digital books during certain periods of time becomes highly competitive, forcing some students to purchase the digital books instead of borrowing them.

It would be advantageous to provide a method and system that overcomes at least some of the above-mentioned limitations of the prior art.

SUMMARY OF EMBODIMENTS OF THE INVENTION

In accordance with an aspect of the invention there is provided a method comprising: receiving at an e-book lending library from an electronic device associated with a user, via a communications network, a request to borrow a first e-book for a predetermined loan period; in response to determining that a lending license for the first e-book is unavailable during the entire predetermined loan period, retrieving time slicing data from a storage device, the time slicing data including an indication of an available time block during the predetermined loan period, during which time block another user has agreed to relinquish the lending license for the first e-book; providing from the e-book lending library to the electronic device associated with the user, via the communications network, the retrieved time slicing data; displaying to the user via the electronic device the indication of the available time block; in response to the user selecting the available time block via the electronic device, providing from the e-book lending library to the electronic device associated with the user, via the communications network, a lending license for the e-book that is valid only during the selected available time block; and, using the provided lending license, enabling access to the first e-book via the electronic device during the time block.

In accordance with an embodiment of the invention there is provided a method comprising: receiving at an e-book lending library from an electronic device associated with a user, via a communications network, a request to borrow a first e-book for a predetermined loan period, the predetermined loan period comprising time slices during which access to the first e-book is requested and other than comprising a contiguous block of time; determining whether a lending license for the first e-book is available during the time slices; when a lending license is determined to be available during the time slices, providing from the e-book lending library to the electronic device associated with the user, via the communications network, a lending license for the e-book that is valid only during the time slices; and, using the provided lending license, enabling access to the first e-book via the electronic device during the loan period.

In accordance with an embodiment of the invention there is provided a method comprising: receiving at an e-book lending library from an electronic device associated with a first user, via a communications network, an request to borrow a first e-book for any loan period; determining an available time block; for the e-book, the available time block during a lending period of the e-book during which it is on loan to at least another user; and, notifying the first user of the available time block.

BRIEF DESCRIPTION OF THE DRAWINGS

Exemplary embodiments of the invention will now be described in conjunction with the following drawings, in which.

DETAILED DESCRIPTION OF EMBODIMENTS
OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
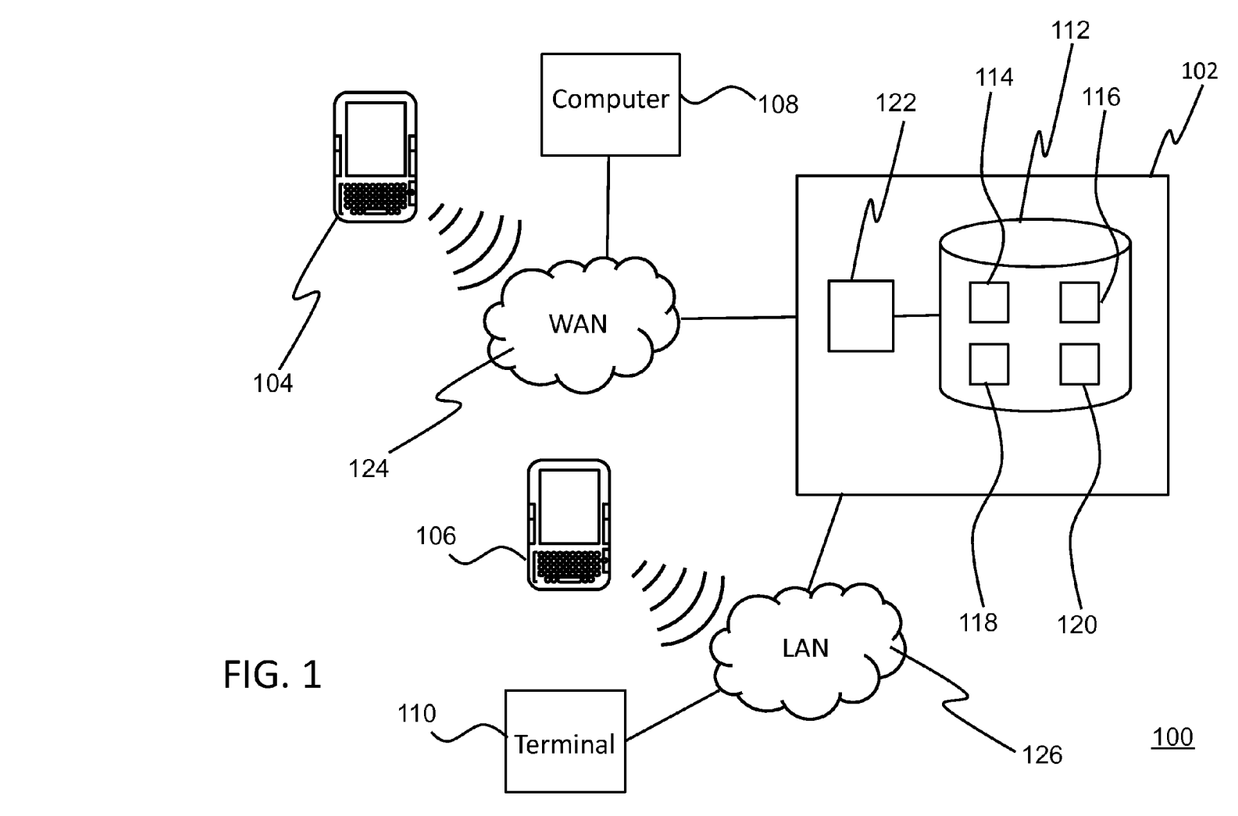
FIG. 1 is a simplified block diagram showing a system according to an embodiment of the instant invention.

Referring to FIG. 1, shown is a simplified block diagram of a system 100 according to an embodiment of the instant invention. System 100 includes an e-book lending library 102 and a plurality of user devices including portable electronic devices 104 and 106, personal computer 108, and terminal 110. The e-book lending library 102 further includes a data storage system 112 for storing e-book content 114, e-book lending licenses 116, time slicing data 118, and library patron data 120. Additionally, the e-book lending library 102 includes a processor 122 having in execution thereon at least a process for controlling functions of the e-book lending library 102. Optionally, the data storage system 112 comprises a plurality of separate data storage devices (not shown) for storing the e-book content 114, the e-book lending licenses 116, the time slicing data 118, and the library patron data 120.

During use an e-book that is requested by a user is provided to the portable electronic device 104 or to the computer 108 via a wide area network (WAN) 124, such as for instance the Internet, or is provided to the portable electronic device 106 or to the terminal 110 via local area network 126. A registered patron may access the e-book lending library 102 via WAN 124 using the portable electronic device 104 or the computer 108 from virtually anywhere that an Internet connection is available. Additionally, portable electronic device 104 optionally connects to WAN 124 via a WI-FI network, via Bluetooth, or via a cellular network. On the other hand, the registered patron must be present in an actual library branch in order to access the e-book lending library 102 via LAN 126 using the portable electronic device 106 or the terminal 110. The portable electronic device 106 may connect to LAN 126 via a WI-FI network, via a WI-FI access point, or via Bluetooth within the library branch.

Referring still to FIG. 1, the e-book lending library 102 includes at least one "instance" of each of a plurality of different e-books. In particular, each e-book that is stored in e-book content 114 of data storage system 112 is associated with at least one lending license that is stored in e-book lending licenses 116 of data storage system 112. By way of a specific and non-limiting example, a separate lending license is required for each e-book instance. In this case, the e-book lending library 102 is required to purchase three separate lending licenses for a first e-book in order to be authorized to lend three instances of the first e-book during overlapping periods of time. When all three lending licenses have been provided to different users, then the first e-book is unavailable temporarily for being loaned. Since the number of lending licenses associated with the first e-book is limited, a user must wait for one of the three instances of the first e-book to be "returned" to the e-book lending library 102 before they are able to borrow the first e-book.

Figure 2:
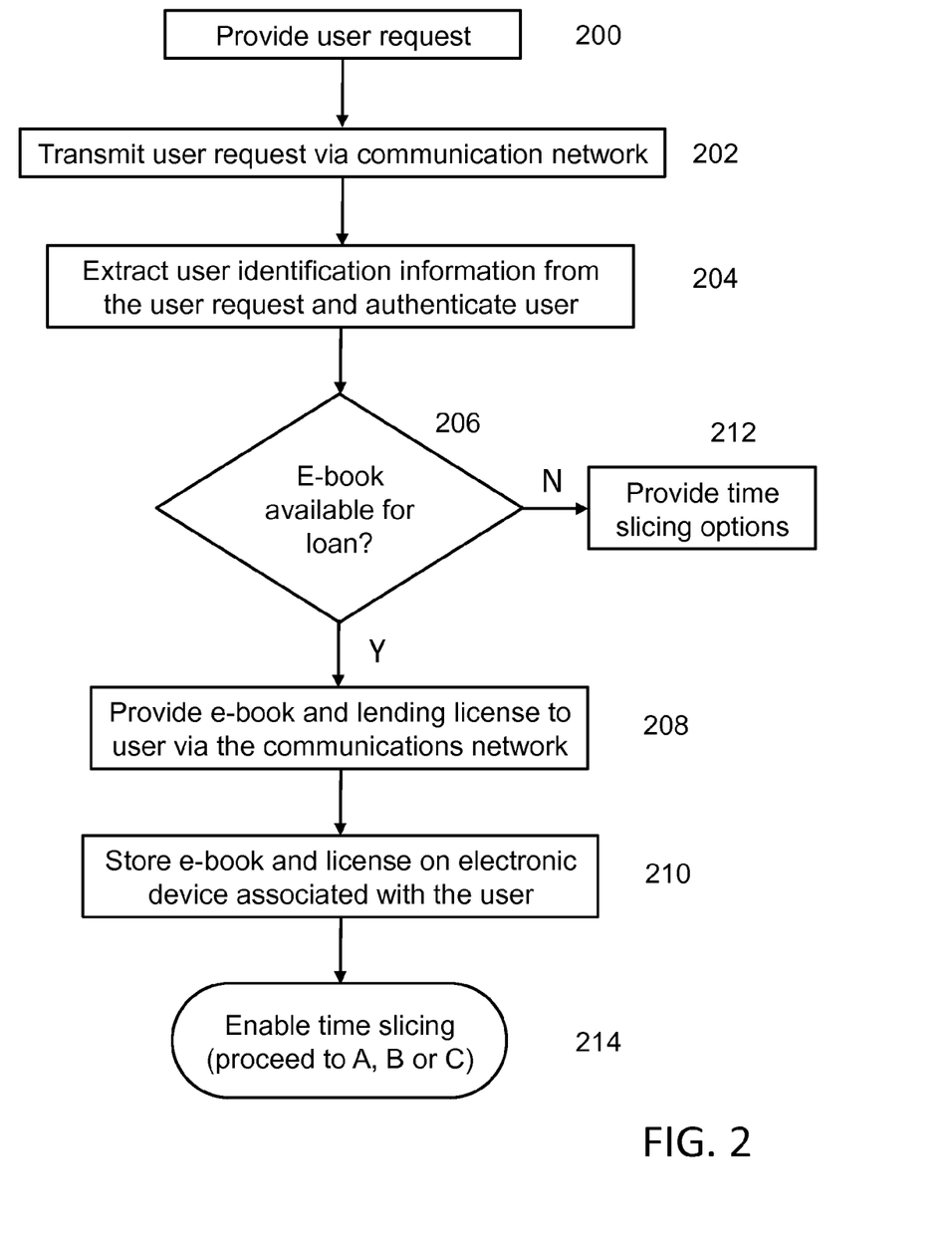
FIG. 2 is a simplified flow diagram showing a method according to an embodiment of the instant invention.

Referring now to FIG. 2, shown is a simplified flow diagram of a method according to an embodiment of the instant invention. In this specific and non-limiting example a user uses the portable electronic device 104 to access the e-book lending library 102 via WAN 124. In particular, at 200 the user provides a request via a data input portion of the portable electronic device 104. The request includes an indication of a first e-book that the user wishes to borrow from the e-book lending library 102, as well as user identification information for authenticating the user to the e-book lending library 102, such as for instance at least two of a library card number, a user name, and a password. In an embodiment, a plurality of different e-book selections is displayed to the user via a display portion of the portable electronic device 104. For instance, a plurality of icons, each icon representing a different e-book selection, is displayed via a touch-sensitive screen portion of the portable electronic device 104. The icons are human intelligible, such as for instance an image of the cover art of an e-book that is represented by the e-book selection. In general, an e-book selection is a menu item representing an e-book that is stored in the e-book lending library 102, and it is selectable by the user for initiating a request to borrow the e-book that is represented by the e-book selection. The user may provide an indication for selecting one of the displayed e-book selections simply by touching the touch-sensitive screen of the portable electronic device 104. Optionally, the e-book selection is displayed in another human intelligible form, such as for instance as the text of the title of the e-book that is represented by the e-book selection.

At 202 the request is transmitted from the portable electronic device 104 to the processor 122 of the e-book lending library 102 via WAN 124. At 204 a process in execution on the processor 122 extracts the user identification information from the request message, and compares it with library patron data 120 that is stored in data storage system 112. When the user is authenticated successfully at 204 as a registered patron, then a process in execution on the processor 122 is enabled for processing at 206 e-book loan requests from the user, and for providing at 208 the requested e-books from the e-book lending library 102 to the portable electronic device 104. For instance, a process that is in execution on the processor 122 extracts e-book loan request information from the request message. In the instant example, the e-book loan request information includes an indication of the first e-book. A process in execution on the processor 122 determines at 206 a current lending status of the first e-book as either available for lending or unavailable for lending. If it is determined that the first e-book is currently available for being loaned, then at 208 a lending license for the first e-book is retrieved from storage system 112 and is provided with the first e-book to the portable electronic device 104 via WAN 124. Once the first e-book and the lending license associated therewith are received and stored on the portable electronic device 104 at 210, the user is able to view the first e-book via a display portion of the portable electronic device 104, until the end of the loan period. At 214 the user enables time slicing of the lending license, so as to allow another user to have access to the first e-book prior to the end of the loan period. As is discussed in more detail below with reference to FIGS. 4-6, the user defines a time block during which the lending license is to be relinquished by the user so that it may be made available to another user. Typically, the time block is short relative to the loan period, such as for instance several hours. The time block optionally reoccurs at a defined interval, such as for instance daily, or is a one-time occurrence. Optionally, the user "schedules" a plurality of time blocks based on their expected routine during the loan period.

Figure 3:
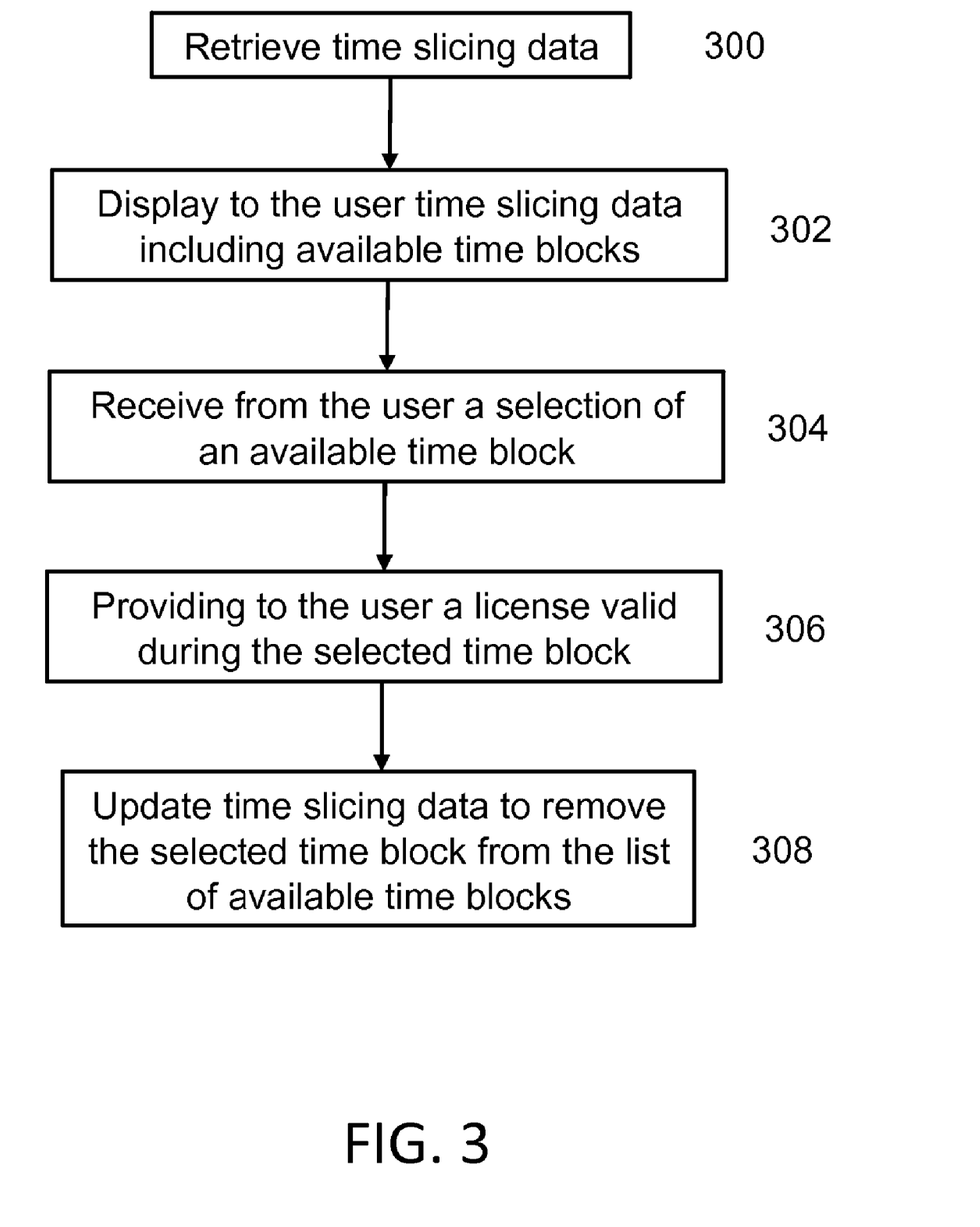
FIG. 3 is a simplified flow diagram showing a method for providing access to an e-book based on time-slicing of a lending license associated therewith, according to an embodiment of the instant invention.

Alternatively, if it is determined at 206 that the first e-book is not currently available for being loaned, then at 212 the user is provided an opportunity to obtain access to the first e-book based on time-slicing of the lending license. Referring also to FIG. 3, a process in execution on the processor 122 retrieves time slicing data 118 from data storage system 112 at 300, including an indication of time blocks during which the lending license for the first e-book has been made available by another user. At 302 the time slicing data 118 are transmitted to the user via WAN 124 and displayed via the display portion of portable electronic device 104. At 304, the process in execution on the processor 122 receives from the user a selection of an available time block. At 306 the process in execution on the processor 122 provides a lending license to the user via the WAN 124. In particular, the provided lending license is valid during the selected time block but it is not valid outside of the selected time block. At 308, the process in execution on the processor 122 updates the time slicing data stored on data storage system 112 to delete the selected time block from the list of available time blocks.

Using the lending license that is provided in accordance with the method of FIG. 3, the user is able to view and otherwise utilize the first e-book in a normal manner during the selected time block. Prior to the start of the selected time block and subsequent to the end of the selected time block, the user is prevented from accessing the first e-book. In addition, another user that has agreed to relinquish the lending license during the selected time block is prevented from accessing the first e-book during the selected time block. In this way, only one user at a time is permitted to access the first e-book using a single lending license. That being said, the first e-book is utilized by a plurality of users during a greater portion of the loan period than would be the case if only a single user had access to the e-book. Additionally, when the lending library has a plurality of instances of the first e-book, a user may attempt to "string together" substantially continuous access to the first e-book based on time-sliced lending licenses for the plurality of instances of the first e-book.

Figure 4:
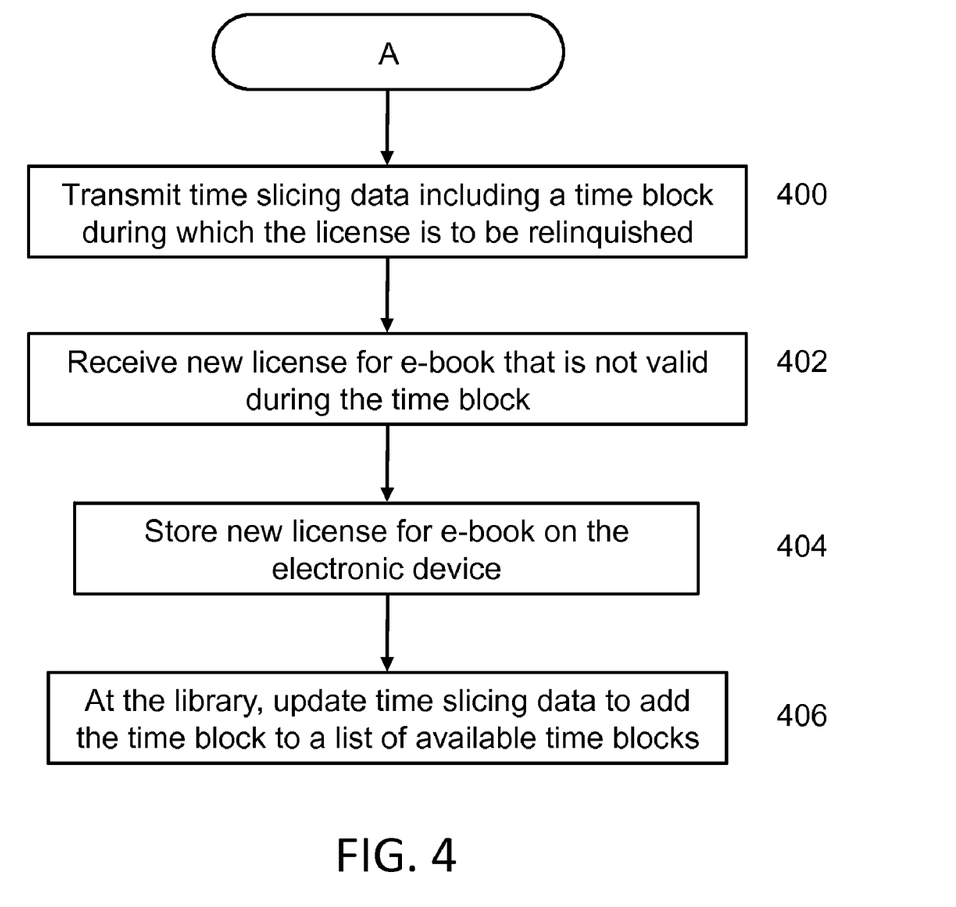
FIG. 4 is a simplified flow diagram of a method for enabling time slicing of a lending license, according to an embodiment of the instant invention.

Referring now to FIG. 4, shown is a method of enabling time slicing of a lending license according to an embodiment of the instant invention. For instance, the method of FIG. 4 is performed at step 214 of the method of FIG. 2 after the user has stored the first e-book and the lending license associated therewith on portable electronic device 104. At 400 the user transmits time slicing data from portable electronic device 104 to the e-book lending library 102 via WAN 124, the time slicing data including an indication of a time block during which the user agrees to relinquish the lending license for use by another user. By way of a specific and non-limiting example, the user wishes to set aside the time between 11:00 pm and 8:00 am for sleeping, relaxation, socializing etc. The user defines a reoccurring time block with a start time of 11:00 pm and an end time of 8:00 am, and an indication of the reoccurring time block is transmitted via WAN 124 to a process in execution on the processor 122. In response, at 402 the process in execution on the processor 122 transmits to the user via WAN 124 a new lending license for the first e-book. In particular, the new lending license is not valid during the reoccurring time block. At 404 the new lending license is stored on the portable electronic device 104 in place of the original lending license that was provided at 208. Finally, at 406 the process in execution on the processor 122 updates the time slicing data 118 that is stored on data storage system 112. The updated time slicing data identifies the lending license as being available for use by another user during the time block. Of course the user is prevented from accessing the first e-book during the time block, regardless of whether or not the lending license actually is provided to another user, since the new lending license that is stored at 404 is not valid during the time block.

Figure 5:
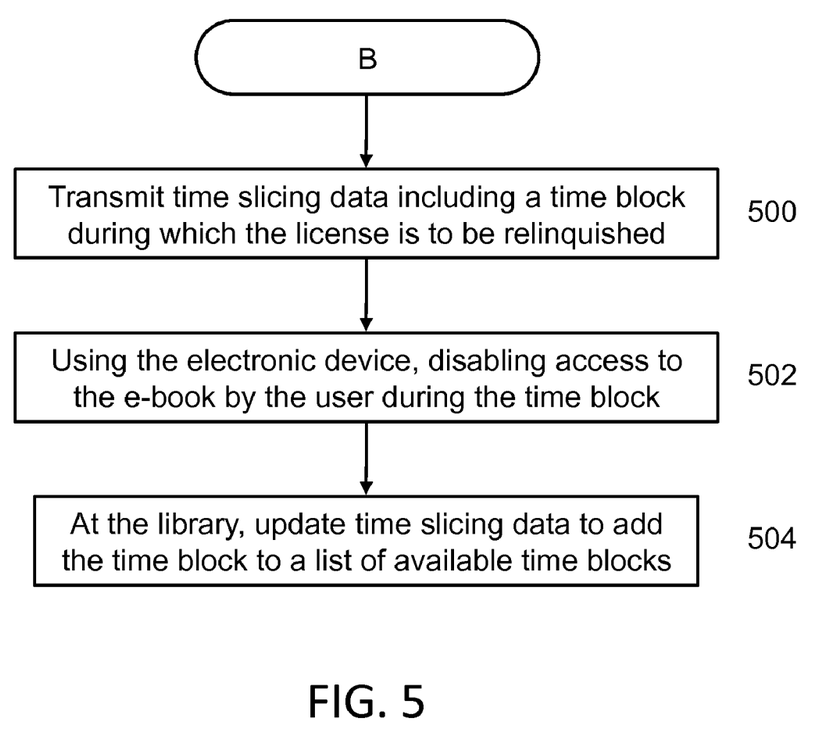
FIG. 5 is a simplified flow diagram of a method for enabling time slicing of a lending license, according to an embodiment of the instant invention.

Referring now to FIG. 5, shown is another method of enabling time slicing of a lending license according to an embodiment of the instant invention. For instance, the method of FIG. 5 is performed at step 214 of the method of FIG. 2 after the user has stored the first e-book and the lending license associated therewith on portable electronic device 104. At 500 the user transmits time slicing data to the e-book lending library 102 via WAN 124, the time slicing data including a time block during which the user agrees to relinquish the lending license for use by another user. By way of a specific and non-limiting example, the user wishes to set aside the time between 11:00 pm and 8:00 am for sleeping, relaxation, socializing etc. The user defines a reoccurring time block with a start time of 11:00 pm and an end time of 8:00 am, which is transmitted via WAN 124 to a process in execution on the processor 122. At 502, the portable electronic device 104 disables access to the e-book by the user during the time block. For instance, the portable electronic device includes a clock circuit for providing a clock signal and a processor responsive to the clock signal for controlling access to the first e-book. When the clock signal indicates that the time is 11:00 pm, in this specific and non-limiting example, a process in execution on the processor disables access to the first e-book. Similarly, when the clock signal indicates that the time is 8:00 am, again in this specific and non-limiting example, the process in execution on the processor enables access to the first e-book. At 504 the process in execution on the processor 122 updates the time slicing data 118 that is stored on data storage system 112. The updated time slicing data identifies the lending license as being available for use by another user during the time block.

Figure 6:
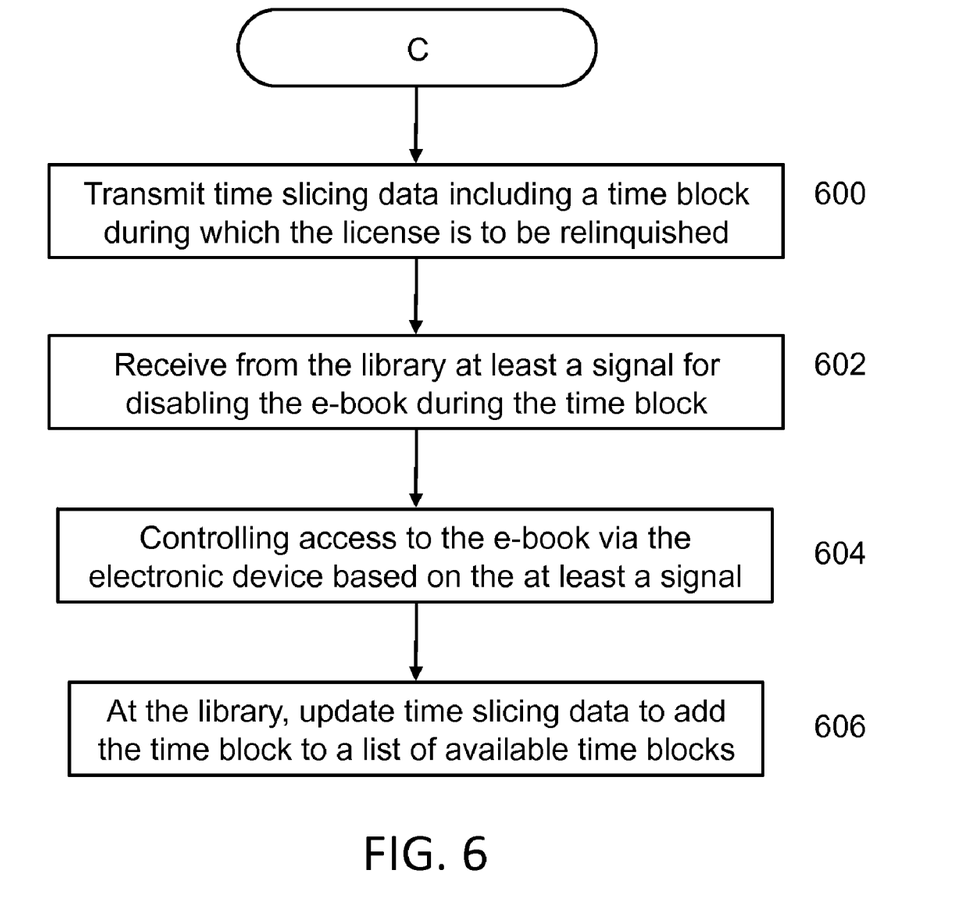
FIG. 6 is a simplified flow diagram of a method for enabling time slicing of a lending license, according to an embodiment of the instant invention.

Referring now to FIG. 6, shown is a method of enabling time slicing of a lending license according to an embodiment of the instant invention. For instance, the method of FIG. 6 is performed at step 214 of the method of FIG. 2. At 600 the user transmits time slicing data to the e-book lending library via WAN 124, the time slicing data including a time block during which the user agrees to relinquish the lending license for use by another user. By way of a specific and non-limiting example, the user wishes to set aside the time between 11:00 pm and 8:00 am for sleeping, relaxation, socializing etc. The user defines a reoccurring time block with a start time of 11:00 pm and an end time of 8:00 am, which is transmitted to via WAN 124 to a process in execution on the processor 122. In response, at the start of the time block the process in execution on the processor 122 transmits to the user via WAN 124 at least a signal for disabling access to the first e-book via the portable electronic device 104 during the reoccurring time block. At 604 access to the first e-book is controlled based on the at least a signal. For instance, when the portable electronic device 104 is connected to WAN 124 and receives the at least a signal either at or before the start of the time block, then access to the first e-book is disabled and a confirmation is transmitted back to the e-book lending library 102. In an embodiment, the at least a signal includes one of a duration of the time block and an absolute time for defining the end of the time block. Accordingly, based on the at least a signal, once access to the first e-book is disabled, the user must wait until the defined end of the time block to access the e-book. Finally, at 606 the process in execution on the processor 122 updates the time slicing data 118 that is stored on data storage system 112. The updated time slicing data identifies the lending license as being available for use by another user during the time block.

Figure 7:
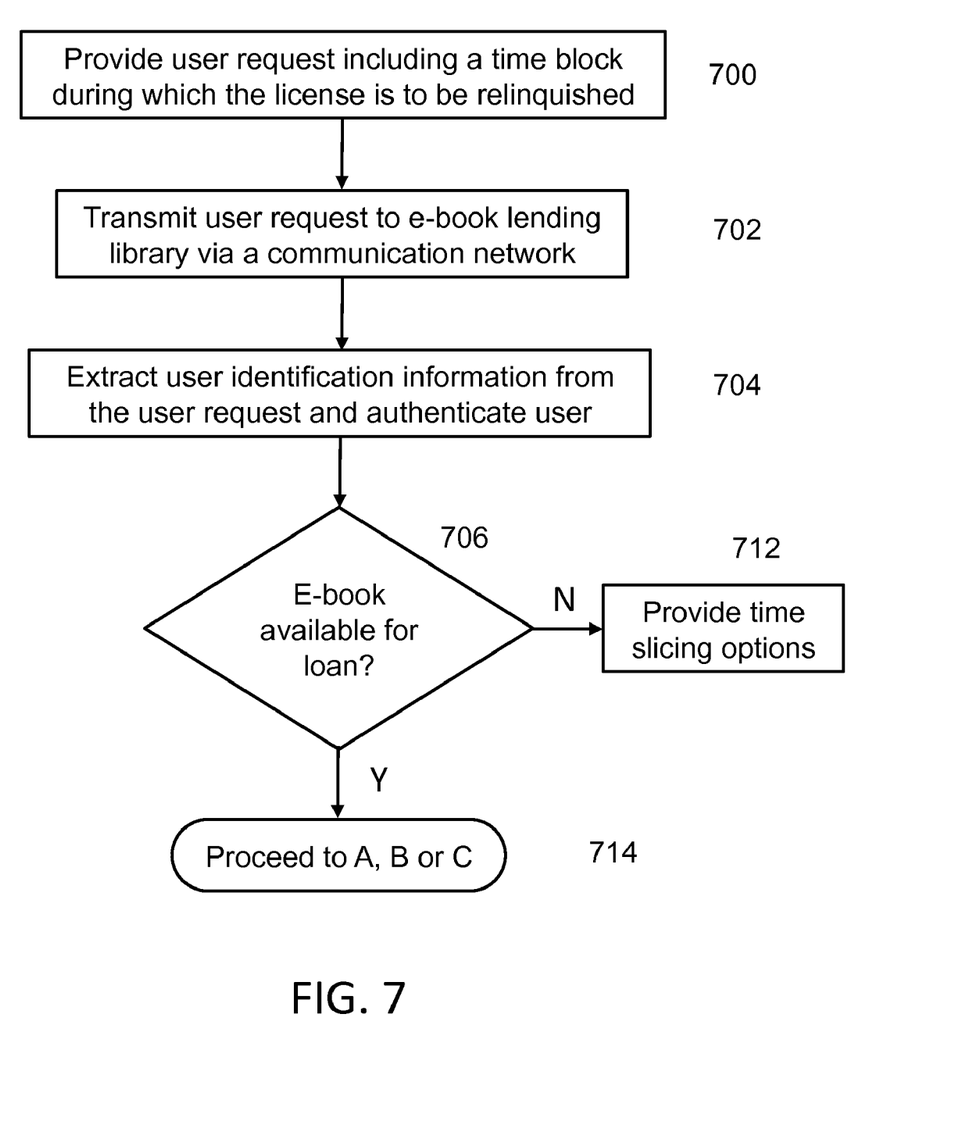
FIG. 7 is a simplified flow diagram showing a method according to an embodiment of the instant invention.

Referring now to FIG. 7, shown is a simplified flow diagram of a method according to an embodiment of the instant invention. In this specific and non-limiting example a user uses the portable electronic device 104 to access the e-book lending library 102 via WAN 124. In particular, at 700 the user provides a request via a data input portion of the portable electronic device 104. The request includes an indication of a first e-book that the user wishes to borrow from the e-book lending library 102, as well as user identification information for authenticating the user to the e-book lending library 102, such as for instance at least two of a library card number, a user name, and a password. In an embodiment, a plurality of different e-book selections is displayed to the user via a display portion of the portable electronic device 104. For instance, a plurality of icons, each icon representing a different e-book selection, is displayed via a touch-sensitive screen portion of the portable electronic device 104. The icons are human intelligible, such as for instance an image of the cover art of an e-book that is represented by the e-book selection. In general, an e-book selection is a menu item representing an e-book that is stored in the e-book lending library 102, and it is selectable by the user for initiating a request to borrow the e-book that is represented by the e-book selection. The user may provide an indication for selecting one of the displayed e-book selections simply by touching the touch-sensitive screen of the portable electronic device 104. Optionally, the e-book selection is displayed in another human intelligible form, such as for instance as the text of the title of the e-book that is represented by the e-book selection.

Referring still to FIG. 7, the request that is provided by the user at 700 further includes time slicing data, including a time block during which the user agrees to relinquish the lending license for use by another user. By way of a specific and non-limiting example, the user wishes to set aside the time between 11:00 pm and 8:00 am for sleeping, relaxation, socializing etc. The user defines a reoccurring time block with a start time of 11:00 pm and an end time of 8:00 am, which is transmitted via WAN 124 to a process in execution on the processor 122. At 702 the request including the time slicing data is transmitted from the portable electronic device 104 to the processor 122 of the e-book lending library 102 via WAN 124. At 704 a process in execution on the processor 122 extracts the user identification information from the request message, and compares it with library patron data 120 that is stored in data storage system 112. When the user is authenticated successfully at 704 as a registered patron, then a process in execution on the processor 122 is enabled for processing at 706 e-book loan requests from the user. For instance, a process that is in execution on the processor 122 extracts e-book loan request information from the request message. In the instant example, the e-book loan request information includes an indication of the first e-book. A process in execution on the processor 122 determines at 706 a current lending status of the first e-book as either available for lending or unavailable for lending. If it is determined that the first e-book is currently available for being loaned, then at 714 the first e-book is provided to the user and time slicing is enabled, as is described below in greater detail with reference to FIGS. 8-10.

Alternatively, if it is determined at 706 that the first e-book is not currently available for being loaned, then at 712 the user is provided an opportunity to obtain access to the e-book based on time-slicing of the lending license. Referring again to FIG. 3, a process in execution on the processor 122 retrieves time slicing data 118 from data storage system 112 at 300, including time blocks during which the lending license for the first e-book is available. At 302 the time slicing data 118 are transmitted to the user via WAN 124 and displayed via the display portion of portable electronic device 104. At 304, the process in execution on the processor 122 receives from the user a selection of an available time block. At 306 the process in execution on the processor 122 provides a lending license to the user via the WAN 124. In particular, the provided lending license is valid during the selected time block but it is not valid outside of the selected time block. At 308, the process in execution on the processor 122 updates the time slicing data stored on data storage system 112 to delete the selected time block from the list of available time blocks.

Using the lending license that is provided according to the method of FIG. 3, the user is able to view and otherwise utilize the first e-book in a normal manner during the selected time block. Prior to the start of the selected time block and subsequent to the end of the selected time block, the user is prevented from accessing the first e-book. In addition, another user that has agreed to relinquish the lending license during the selected time block is prevented from accessing the first e-book during the selected time block. In this way, only one user at a time is permitted to access the first e-book using a single lending license. That being said, the first e-book is utilized by a plurality of users during a greater portion of the loan period than would be the case if only a single user had access to the first e-book. Additionally, when the lending library has a plurality of instances of the first e-book, a user may attempt to "string together" substantially continuous access to the first e-book based on time-sliced lending licenses for the plurality of instances of the first e-book.

Figure 8:
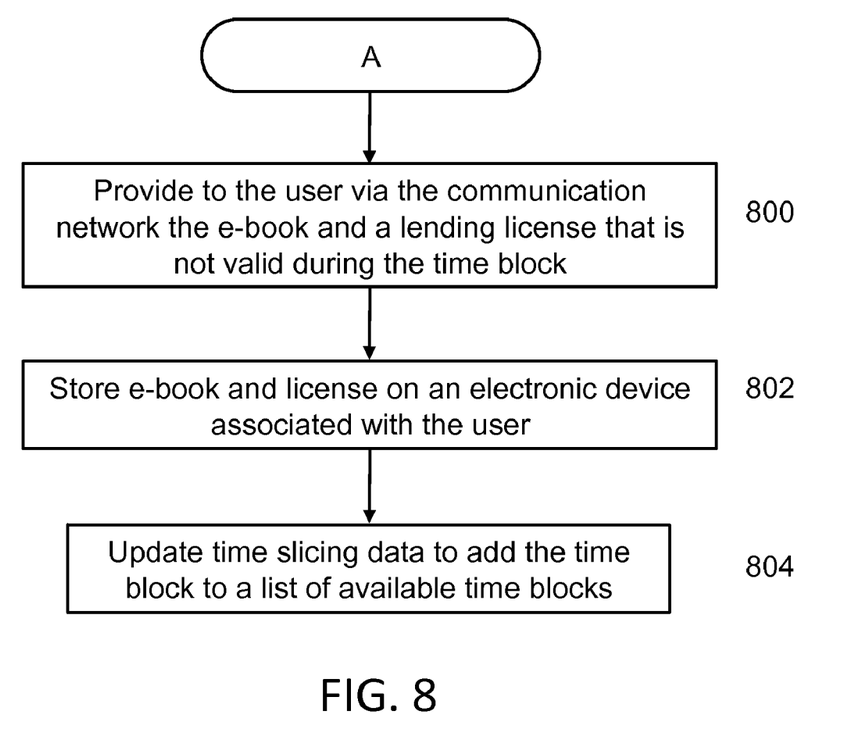
FIG. 8 is a simplified flow diagram of a method for enabling time slicing of a lending license, according to an embodiment of the instant invention.

Referring now to FIG. 8, shown is a method of providing a requested e-book to a user and enabling time slicing of a lending license associated with the e-book, according to an embodiment of the instant invention. For instance, the method of FIG. 8 is performed at step 714 of the method of FIG. 7. At 800 the e-book lending library provides to the user via the WAN 124 the first e-book and a lending license associated therewith. In particular, the lending license is not valid during the time block that was specified in the user request at 700. At 802 the user stores the first e-book and the lending license on portable electronic device 104. At 804 a process in execution on the processor 122 updates the time slicing data stored on data storage system 112 to add the selected time block to a list of available time blocks associated with the first e-book. The updated time slicing data identifies the lending license as being available for use by another user during the time block. Of course the user is prevented from accessing the first e-book during the time block, regardless of whether or not the lending license actually is provided to another user, since the lending license that is stored at 802 is not valid during the time block.

Figure 9:
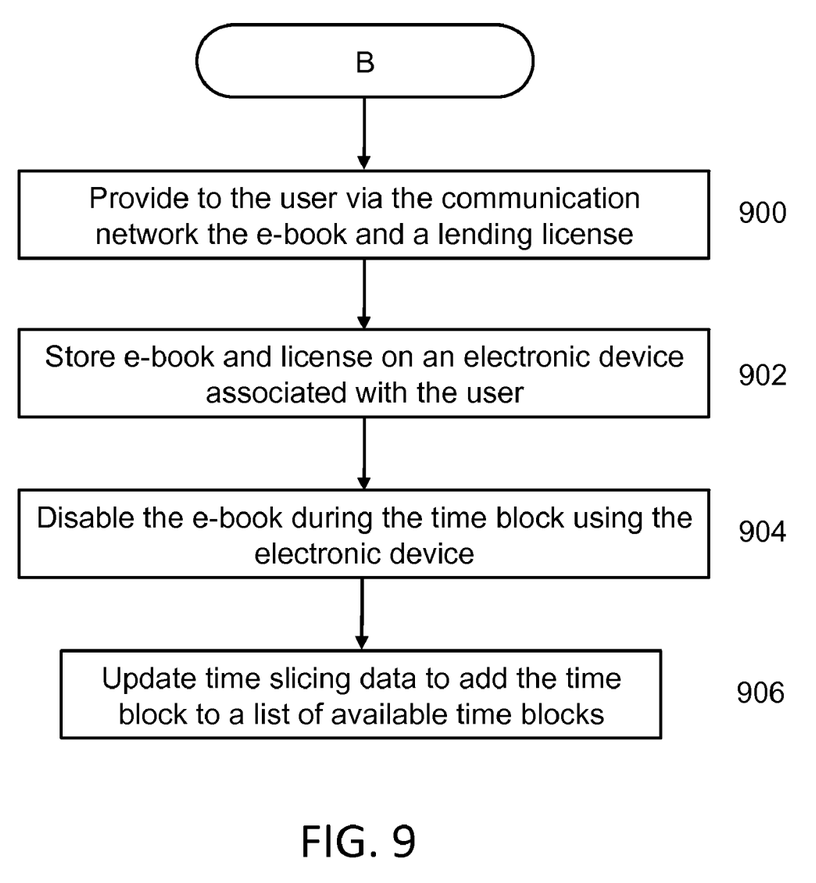
FIG. 9 is a simplified flow diagram of a method for enabling time slicing of a lending license, according to an embodiment of the instant invention; and, FIG. 10 is a simplified flow diagram of a method for enabling time slicing of a lending license, according to an embodiment of the instant invention.

Referring now to FIG. 9, shown is another method of providing a requested e-book to a user and enabling time slicing of a lending license associated with the e-book, according to an embodiment of the instant invention. For instance, the method of FIG. 9 is performed at step 714 of the method of FIG. 7. At 900 the e-book lending library provides to the user via the WAN 124 the first e-book and a lending license associated therewith. At 902 the user stores the e-book and the lending license on portable electronic device 104. At 904, the portable electronic device 104 disables access to the first e-book by the user during the time block. At 906 the process in execution on the processor 122 updates the time slicing data 118 that is stored on data storage system 112. The updated time slicing data identifies the lending license as being available for use by another user during the time block. Optionally, the user may transmit a request to the e-book lending library to determine a status of the lending license during the time block. If the lending license is not assigned to another user already, then the portable electronic device 104 may unlock the first e-book so as to allow the user to access the first e-book during the time period. Of course, if the lending license is assigned to another user already, then the portable electronic device 104 cannot be unlocked, and the user must wait until the end of the time block to access the first e-book.

Figure 10:
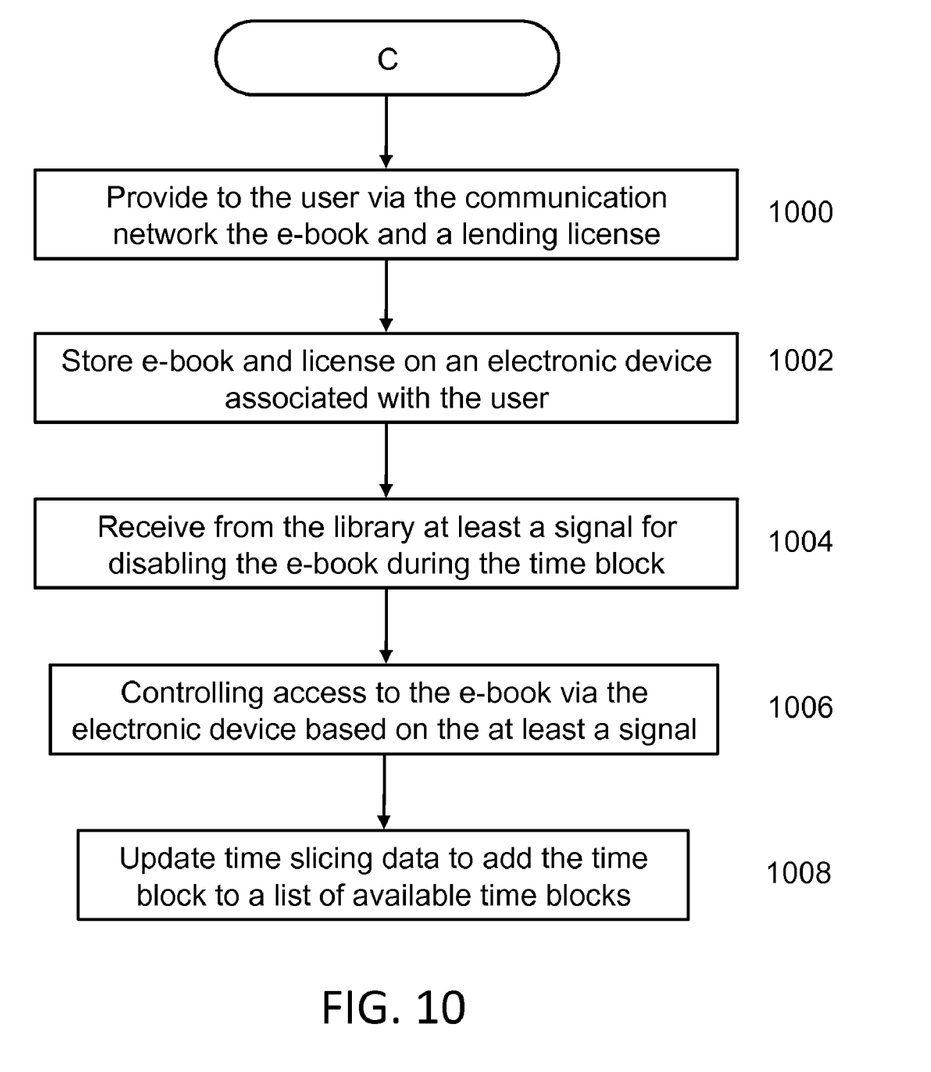

Referring now to FIG. 10, shown is a method of providing a requested e-book to a user and enabling time slicing of a lending license associated with the e-book, according to an embodiment of the instant invention. For instance, the method of FIG. 10 is performed at step 714 of the method of FIG. 7. At 1000 the e-book lending library provides to the user via the WAN 124 the first e-book and a lending license associated therewith. At 1002 the user stores the first e-book and the lending license on portable electronic device 104. At 1004, corresponding to the start of the time block, the process in execution on the processor 122 transmits to the user via WAN 124 at least a signal for disabling access to the first e-book via the portable electronic device 104 during the time block. At 1006 access to the first e-book is controlled based on the at least a signal. For instance, when the portable electronic device 104 is connected to WAN 124 and receives the at least a signal at the start of the time block, then access to the first e-book is disabled and a confirmation is transmitted back to the e-book lending library. In an embodiment, the at least a signal includes one of a duration of the time block and an absolute time for defining the end of the time block. Accordingly, based on the at least a signal, once access to the e-book via 104 is disabled, the user must wait until the defined end of the time block to access the e-book. Finally, at 1008 the process in execution on the processor 122 updates the time slicing data 118 that is stored on data storage system 112. The updated time slicing data identifies the lending license as being available for use by another user during the time block.

Alternatively, if a first user desires access to an e-book on an urgent basis, they indicate this to the digital library. In response, the digital library monitors the e-book usage to determine when a user is no longer using the e-book. For example, the digital library communicates with borrowers of the e-book to inform them that if they are not using the e-book, they can relinquish their rights to it for a time that they can specify.

When a user specifies a time block during which they will not access the e-book, a signal indicating same is provided to the digital library. A second signal is transmitted from the digital library to the electronic device of the first user to indicate an available time block. Optionally, the available time block starts at the present moment. The first user then accepts the time block and is provided access to the e-book when the time block starts—immediately when the time block starts at the present moment. In such a fashion, users who are willing to be inconvenienced and wait for an e-book, can be rewarded with earlier access thereto.

Some non-limiting examples of portable electronic devices 104 and 106 include notebook computers, netbooks/subnotebooks, personal digital assistants (PDAs), smart phones such as for instance the Apple® IPhone®, gaming devices such as for instance the Nintendo® DS, DS Lite or DSi, digital book readers such as for instance the Amazon Kindle 2, etc.

Numerous other embodiments may be envisaged without departing from the scope of the invention.

What is claimed is:

1. A method comprising:
receiving from an electronic device associated with a user at an e-book lending library comprising a processor, via a communications network, a request to borrow a first e-book for a predetermined loan period;
determining by the processor that a lending license for the first e-book is unavailable during the entire predetermined loan period;
in response to determining that a lending license for the first e-book is unavailable during the entire predetermined loan period, retrieving by the processor time slicing data from a storage device, the time slicing data including an indication of an available time block during the predetermined loan period, during which time block another user has agreed to relinquish the lending license for the first e-book;

providing from the e-book lending library to the electronic device associated with the user, via the communications network, the retrieved time slicing data;

displaying to the user via the electronic device the indication of the available time block;

in response to the user selecting the available time block via the electronic device, providing from the e-book lending library to the electronic device associated with the user, via the communications network, a lending license for the e-book that is valid only during the selected available time block; and, using the provided lending license, enabling access to the first e-book via the electronic device during the time block.

2. A method according to claim 1,
comprising updating the time slicing data that is stored on the storage device, to remove the selected available time block from a list of available time blocks associated with the first e-book.

3. A method according to claim 1, comprising disabling access by the another user to the first e-book during the selected available time block.

4. A method according to claim 1, comprising providing a further time block other than the time block and during which use of the e-book is requested; and,
when the e-book is available during the further time block and during a period of the lending license, updating the lending license to reflect the further time block during which the e-book is available.

5. A method according to claim 4 comprising:
notifying a user of the updated lending license.

6. A method according to claim 1, comprising transmitting to the user from the e-book lending library at the start of the time block at least a signal for enabling the first user's access to the e-book until the end of the time block.

7. A method according to claim 1, comprising transmitting to the user prior to the start of the time block at least a signal for disabling the first user's access to the e-book at the end of the time block.

8. A method comprising:
receiving at an e-book lending library comprising a processor from an electronic device associated with a user, via a communications network, a request to borrow a first e-book for a predetermined loan period, the predetermined loan period comprising time slices during which access to the first e-book is requested and other than comprising a contiguous block of time;
determining by the processor whether a lending license for the first e-book is available during the time slices;
when a lending license is determined to be available during the time slices, providing from the e-book lending library to the electronic device associated with the user, via the communications network, a lending license for the e-book that is valid only during the time slices and valid for time slices that are non-contiguous; and,
using the provided lending license, enabling access to the first e-book via the electronic device during the loan period.

9. A method according to claim 8 comprising:
updating a database of the lending library to reflect the lending license provided.

10. A method according to claim 9 wherein updating comprises:
storing an indication of time slices that are no longer available for the e-book.

11. A method according to claim 8 wherein the license comprises portions of a licenses relating to each of several different instances of the e-book, the portions of the licenses each relating to different time periods within the loan period.

12. A method according to claim 8 comprising:
in response to determining that a lending license for the first e-book is unavailable during the timeslices, retrieving time slicing data from a storage device, the time slicing data including an indication of at least an available time block, during which time block a lending license for the first e-book is available, the at least an available time block other than a contiguous block of time comprising an entire lending period;
providing from the e-book lending library to the electronic device associated with the user, via the communications network, the retrieved time slicing data;
displaying to the user via the electronic device the indication of the at least an available time block;
in response to the user selecting at least one of the at least an available time block via the electronic device, providing from the e-book lending library to the electronic device associated with the user, via the communications network, a lending license for the e-book that is valid only during the selected least one of the at least an available time block; and,
using the provided lending license, enabling access to the first e-book via the electronic device during the at least one time block of the at least an available time block.

13. A method comprising:
receiving at an e-book lending library comprising a processor from an electronic device associated with a first user, via a communications network, a request to borrow a first e-book for any loan period;
determining by the processor an available time block for the e-book, the available time block occurring during a lending period of the e-book during which it is on loan to at least another user, the available time block other than a time block associated with either another lending license for a same e-book and other than an available concurrent lending license for the same e-book; and,
notifying the first user of the available time block.

14. A method according to claim 13 wherein the first e-book is other than available for loan during a complete loan period from the request time, the first e-book already loaned for a portion of the loan period to another user, the available time block other than overlapping the portion of the loan period.

15. A method according to claim 13 wherein the first e-book is other than available for loan during a timeslice during a loan period from the request time.

16. A method according to claim 13 wherein the first user is notified when the available time block begins.

17. A method according to claim 16 wherein determining is performed more than one time during a period of time until a suitable time block is determined.

18. A method according to claim 17 wherein the another user provides an indication that they will not access the e-book for a single specified period of time and wherein the specified period of time comprises the determined available time block.

19. A method according to claim 18 wherein the indication is provided immediately preceding the single specified period of time.

20. A method according to claim 19 comprising: when the book is closed by the another user, requesting of the reader time clock data for defining an available time block.

21. A method according to claim 13 wherein a system through which the another user accesses the e-book is provided an updated license excluding the available time block and wherein access to the e-book by the another user is prevented during the available time block.

22. A method according to claim 13 wherein a license is provided to the electronic device of the first user for the time block.

23. A method according to claim 1 comprising:
providing to the another user an interface for selecting time slices during a first loan period during which access to the digital e-book is reserved, the first loan period comprising a contiguous block of time;
receiving from the another user information relating to time slices during which the ebook is reserved;
providing to the ebook library first data comprising an indication of time slices during which the ebook is reserved;
determining based on the first data, time slices that are available for the ebook, the time slices other than forming a single contiguous block of time during the first loan period; and
storing data in association with time slices that are available for the ebook.

* * * * *